United States Patent [19]

Derr

[11] 4,079,788

[45] Mar. 21, 1978

[54] HAND-PUSHABLE TILLING DEVICE

[75] Inventor: Carl B. Derr, Bristol, Ind.

[73] Assignee: Esmay Products, Inc., Bristol, Ind.

[21] Appl. No.: 657,483

[22] Filed: Feb. 12, 1976

[51] Int. Cl.² ............................................. A01B 35/02
[52] U.S. Cl. .................................... 172/176; 172/251;
172/254; 172/356; 172/359; 172/675; 172/676;
172/739; 172/762; 172/763
[58] Field of Search ............... 172/356, 354, 739, 676,
172/176, 136, 762, 702, 251, 355, 359, 363, 365,
366, 763, 250, 669, 671, 675, 738, 254

[56] References Cited

U.S. PATENT DOCUMENTS

| 68,393 | 9/1867 | Startzman | 172/136 |
|---|---|---|---|
| 88,275 | 3/1869 | Chapman | 172/356 |
| 91,497 | 6/1869 | Tufts | 172/136 X |
| 289,437 | 12/1883 | Morris | 172/744 X |
| 458,122 | 8/1891 | Williams | 172/251 X |
| 641,244 | 1/1900 | Stowe | 172/356 |
| 815,048 | 3/1906 | Smith | 172/176 X |
| 855,313 | 5/1907 | Holbrook | 172/176 |
| 3,647,005 | 3/1972 | Boyd | 172/675 X |

Primary Examiner—Paul E. Shapiro

Attorney, Agent, or Firm—Wallenstein, Spangenberg, Hattis & Strampel

[57] ABSTRACT

A hand-pushable, tilling device includes a main frame carrying ground-engaging front and rear wheels, handle means on the frame and a selection of tilling tools, including at least a furrow-forming tool and a cultivating tool, each having a shank portion terminating in a transversely extending soil-penetrating projection. The main frame includes a tool-holding frame supported for pivotal movement about a lateral, horizontal axis. In the uppermost position of the tool-holding frame, the latter frame presents a generally horizontally extending recess into which the shank portion of either tool is slidably mountable and locked preferably by a spring-urged latching means. The depth of penetration and the angle of penetration of the soil-penetrating projecting portion of the selected tool is varied preferably by screw means passing through a support member pivoted on a lateral, horizontal axis upon the main frame and secured to a pivoted second support member attached to the tool-holding frame. The rear wheel of the tilling device has an outwardly tapered rim adapted to enter the furrow formed by the furrow-forming tool and pack down the earth and form the same into a generally V-shape to receive the seeds or bulbs to be planted.

20 Claims, 10 Drawing Figures

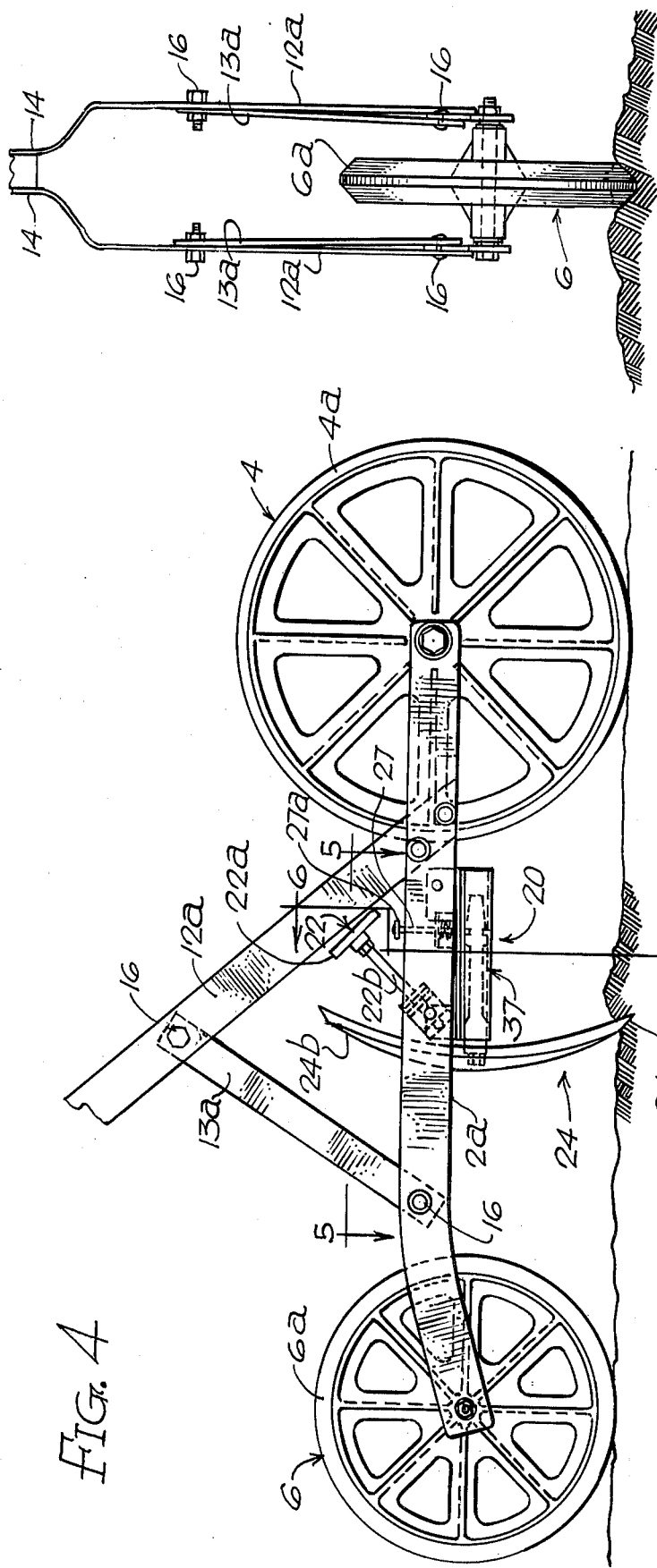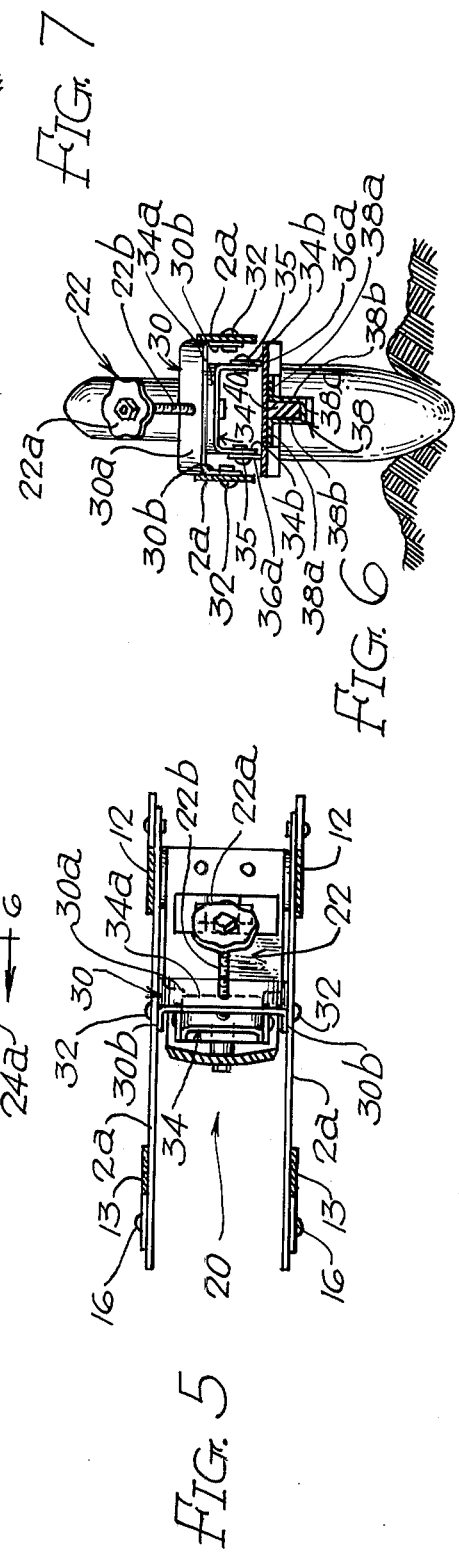

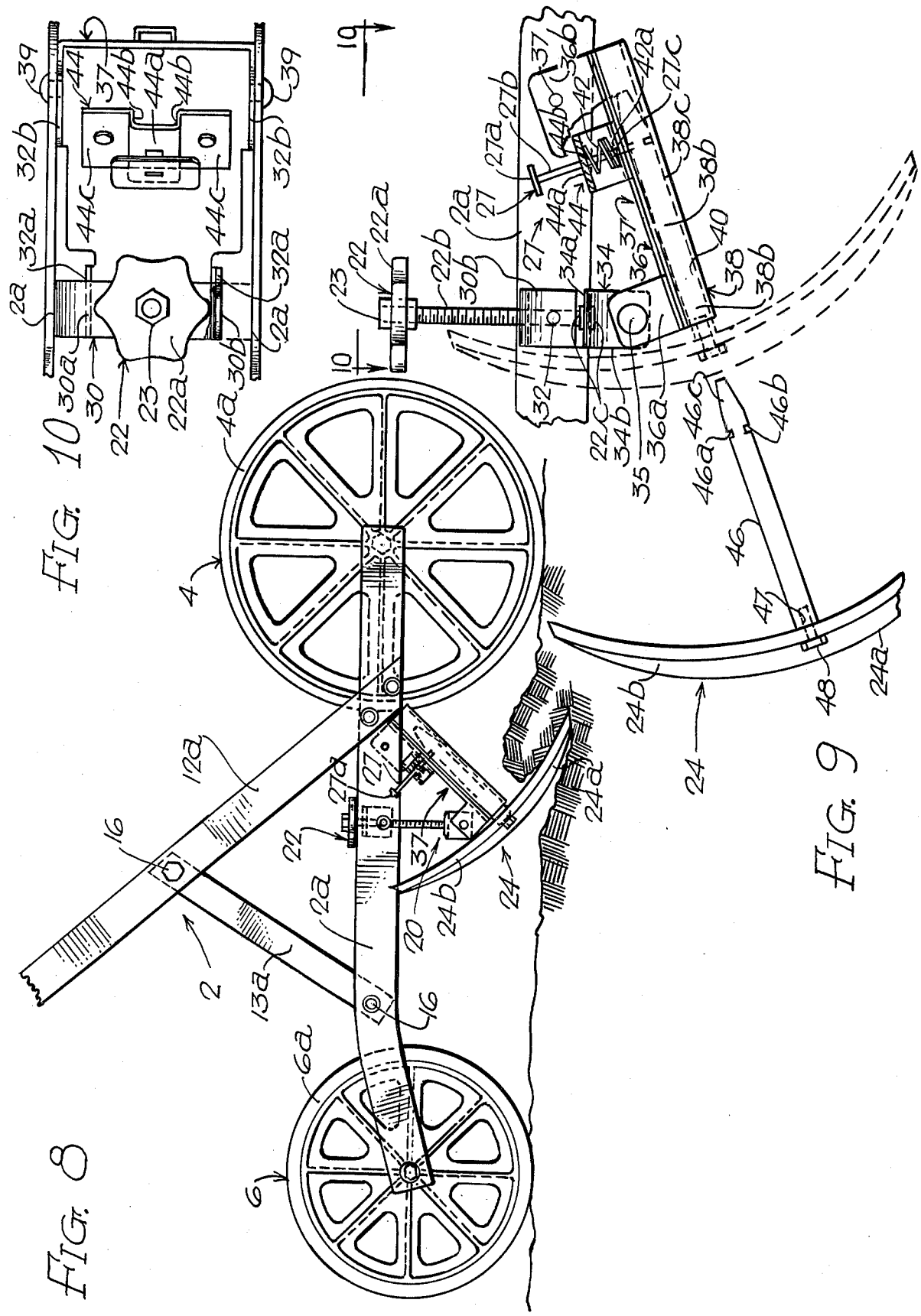

HAND-PUSHABLE TILLING DEVICE

BACKGROUND OF INVENTION

Various hand-pushable garden tool devices have been recently developed as, for example, the combination seeder, furrow-forming and furrow-covering device disclosed and claimed in U.S. Pat. No. 3,774,557, granted Nov. 27, 1973. This garden tool device is excellent for use in planting small and middle sized seeds, but is relatively unsatisfactory for forming the large furrows required, for example, in the planting of potatoes, onions and other root plants or bulbs. Also, the gardent tool device disclosed in this patent does not have the flexibility of receiving a variety of different types of tools, for example, tools for cultivating and weed cutting.

Where hand power is utilized to propel a tilling device of the kind with which the present invention deals, it becomes exceedingly important to minimize the effort necessary to propel the device. Because the furrows which are formed are much deeper and wider than those formed, for example, by the garden tool device disclosed in said U.S. Pat. No. 3,774,557, the stresses and strains placed on the tilling device create difficult design problems to produce a rugged yet light-in-weight assembly which can be manually pushed with relative ease.

Hand powered tilling devices adapted selectively to receive different types and sizes of tilling tools are disclosed, for example, in some very old United States patents as, for example, disclosed in U.S. Pat. No. 57,871, granted Sept. 11, 1866, U.S. Pat. No. 88,275, granted Mar. 30, 1869, and U.S. Pat. No. 1,280,866, granted Oct. 8, 1918. The manner in which the various tools are selectively supportable and vertically adjustable on the hand-powered tilling devices disclosed in these and other tilling devices generally required the inconvenient lossening of nuts and bolts.

It is, accordingly, one of the objects of the invention to provide a hand-powered tilling device where the force required to propel the device is minimized, especially when the tilling tool is adjusted for progressively deeper penetration into the soil.

Another object of the invention is to provide a hand-powered tilling device which is made of modest sized metal parts, so it is relatively light in weight and yet can withstand the forces imparted thereto when digging relatively deep furrows without deformation or other damage thereto.

A further object of the invention is to provide a hand-powered tilling device to which different types of tilling tools can be readily attached quickly and easily. A still further object of the invention is to provide a hand-powered tilling device with depth-of-soil penetration adjusting means which can be more easily adjusted than the adjustable means of tilling devices of the prior art.

SUMMARY OF INVENTION

In accordance with one of the features of the invention, a hand-powered tilling device is provided with a tool-holding frame supported for up and down movement on the main frame of the device so the soil-penetrating projecting portion of the tilling tool carried thereby extends forwardly into the soil at progressively increasing angles to the vertical as the support frame drops in position on the main frame. Means are provided for supporting the tool-holding frame in any one of these adjusted positions. Since the angle of penetration of the tilling tool increases with the depth of penetration of the tilling tool, the force necessary to propel the tilling device will not increase much, if at all, with the depth of penetration of the tilling tool.

In the most preferred form of the invention, the tool-holding frame is supported for pivotal movement about a lateral horizontal axis so the free end thereof drops as it pivots in the direction in which the device is propelled. In such case, the soil-penetrating projecting portion of a tilling tool inclining forwardly will enter the soil at a sharper angle as the tool-holding frame pivots into a lower position. Also, the tool-holding frame position is adjustable, in the most preferred form of the invention, by turning the head portion of a screw in one direction or the other. The screw preferably has a threaded shank portion threading through a first member pivotally supported about a horizontal lateral axis on the main frame of the tilling device.

in accordance with another feature of the invention, the tool-holding frame is designed to receive the shank portions of different tilling tools, which may be tilling tools for selectively performing, furrow-forming and cultivating operations. Each tilling tool has a shank portion terminating in a soil-penetrating projecting portion extending transversely thereto. The tool-holding frame has a recess into which the shank portion of the tool is slidable, the recess extending generally horizontally when the tool-holding frame is in its position where the projecting portion of the tool has its minimum soil-penetrating position. With such a relationship between the shank portion of the tool and the tool-holding frame, the forces imparted to the tilling tool as it is pushed through the soil are distributed in a manner which minimizes the size and weight of the parts necessary to withstand these forces.

In accordance with a related feature of the invention, the shank portion of said tilling tool is releasably held in place by a spring-urged latching pin which is released by simply pulling on the head of the pin, permitting the tilling tool to be pulled from the tool-holding frame recess.

It is desirable to form a furrow with a consistent depth so that the seeds, bulbs or the like dropped therein will be at a consistent depth. However, as a furrow is formed varying sizes of clumps of dirt or varying amounts of loose dirt are left in the bottom of the furrows, so the bottom therefore is generally not of a consistent depth. Therefore, in accordance with another aspect of the invention, the rear wheel of the tilling device located in alignment with the tilling tool is narrower than the width of the furrow cut by the furrow-forming tool supported on the device, so the rear wheel will enter the furrow and pack the loose or clumped earth in the bottom of the furrow to form a furrow of consistent depth and shape. The rear wheel preferably has an outwardly tapered periphery to form a correspondingly tapered furrow to properly center the seeds, bulbs or the like dropped therein.

Other features and advantages of the invention will become apparent upon making reference to the specification to follow, the drawings and the claims.

DESCRIPTION OF DRAWING

FIG. 4 is a fragmentary enlarged side elevational view, with the furrow-forming tool positioned at its highest elevation where it has a minimum penetration into the ground;

FIG. 5 is a fragmentary horizontal sectional view through a portion of the tilling device shown in FIG. 4, taken along section lines 5—5, and shows the support structure for an adjusting screw which adjusts the depth of penetration of the tilling tool utilized on the device;

FIG. 6 is a vertical sectional view through a portion of the tilling device shown in FIG. 4, taken along section lines 6—6, and shows, among other things, the manner in which the rear wheel of the device packs the soil at the bottom of the furrow formed by the furrow-forming tool illustrated;

FIG. 7 is a rear elevational view of the tilling device shown in FIG. 6;

FIG. 8 is a view corresponding to FIG. 4 where the furrow-forming tool is lowered to a point where a much deeper furrow is formed;

FIG. 9 is a fragmentary enlarged view of the tool-holding frame portion of tthe tilling device of FIGS. 1-8, showing in dash lines the position of the furrow-forming tool within the tool-holding frame and in solid lines the furrow-forming member removed from the tool-holding frame; and FIG. 10 is a top view of the tool holding frame portion of the tilling device.

DESCRIPTION OF EXEMPLARY EMBODIMENT OF THE INVENTION

Figure 1:
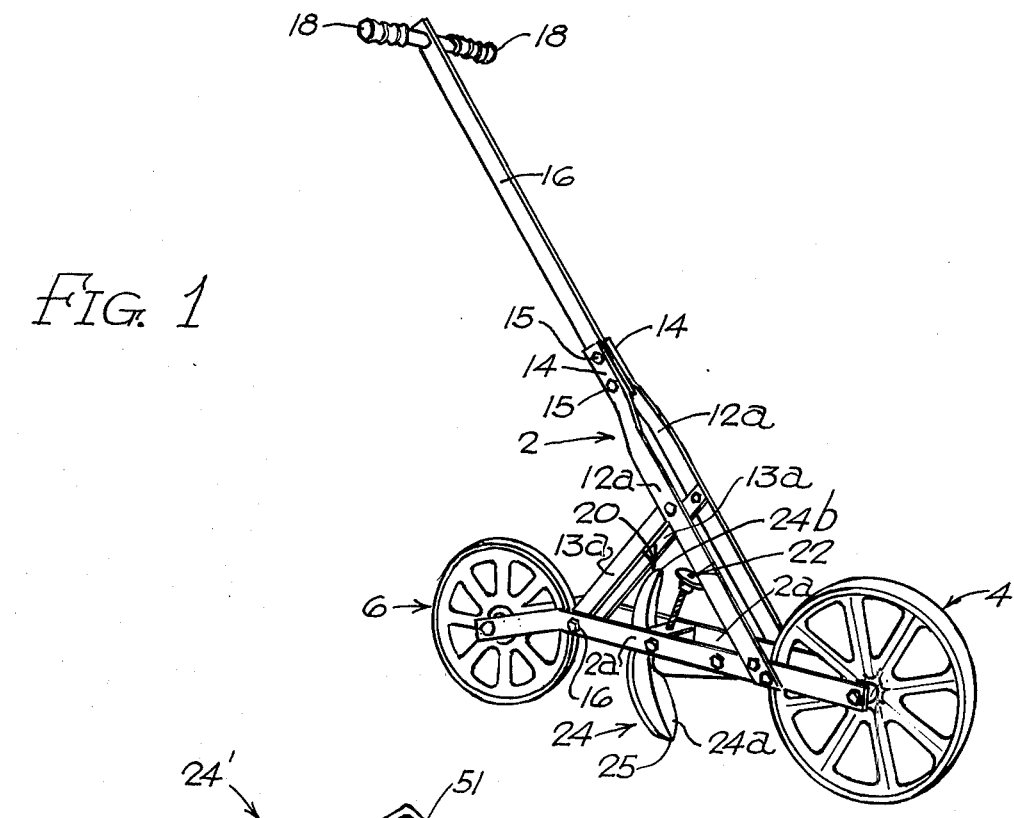
FIG. 1 is a perspective view of a hand-pushable tilling device incorporating features of the present invention, with a double-ended furrow-forming tool in place thereon.

Referring now to the drawings showing a preferred exemplary form of the invention, the tilling device thereshown includes a base frame assembly generally indicated by reference numeral 2 having generally horizontally extending, laterally spaced side frame members 2a—2a carrying a single front wheel 4 rotatably mounted between the front end portions of the side frame members 2a—2a, and a single rear wheel 6 rotatably supported between the rear end portions of the side frame members 2a—2a. The center points of the front and rear wheels 4 and 6 are in longitudinal alignment in a common vertical plane containing the center of gravity of the seed planter.

Extending upwardly and rearwardly from intermediate portions of the side frame member 2a—2a are a pair of side bars 12a—12a terminating at the top of closely confronting portions 14—14 between which is securely anchored by suitable fastening bolts 15—15 an extension bar 16 terminating in a pair of transversely extending handle bars 18—18. A pair of frame-bracing bars 13a—13a extend between the side bars 12a—12a and the side frame members 2a—2a where they are secured thereto by suitable fastening bolts 16—16.

Figure 2:
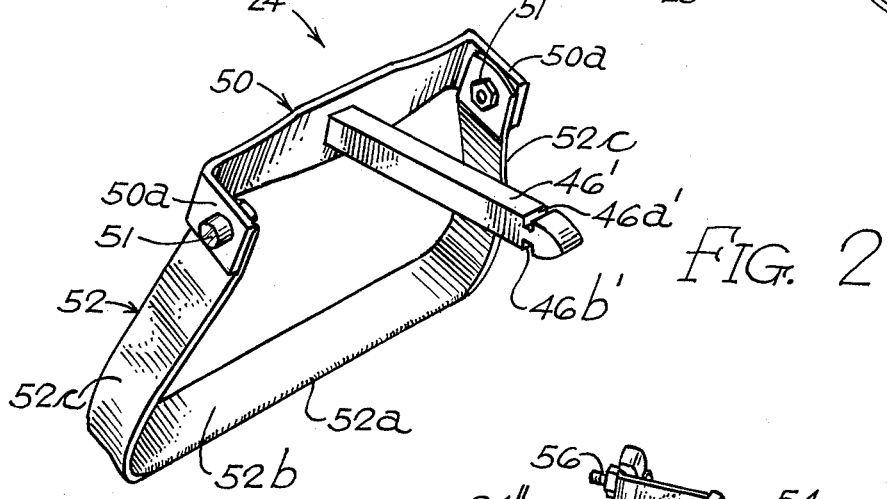
FIG. 2 is an enlarged perspective view of a weed-cutting tool which can be substituted for the furrow-forming tool shown in FIG. 1.

Secured between the side frame members 2a—2a is a tilling tool-carrying and adjusting assembly generally indicated by reference numeral 20. This assembly includes an adjusting screw 22 which, when rotated in one direction or the other, varies the vertical elevation of a tilling tool which is shown in FIG. 1 as a double-ended furrow-forming tool 24. In a manner to be described, as the tool-holding and adjusting assembly 20 is lowered progressively by rotating the screw 22 in one direction the soil-penetrating projecting portion 24a of the tilling tool 24 inclines at a greater angle to the vertical, to lessen the force which would otherwise be required to push the soil tilling device. Also, in a manner to be described, the tool-holding and adjusting assembly 20 is constructed to enable the easy replacement of the tilling tool 24 by other tools, like the weed cutting tool or hoe 24' shown in FIG. 2, or the cultivating tool 24" shown in FIG. 3. The removal of a tool from the tool-holding and adjusting assembly 20 can be accomplished by simply pulling on a laterally projecting head portion 27a of a latch pin 27, which permits the tilling tool to be pulled from the tool-holding assembly 20.

The tilling tool holding assembly 20 includes a member 30, preferably channel-shaped as shown, with side flange 30b—30b anchored by pivot-forming rivets 32—32 or the like to the side frame members 2a—2a, so that the member 30 pivots about a lateral horizontal axis. The member 30 also has a bridging portion 30a through which the threaded shank portion 22b of the screw 22 is threaded. The screw 22 has a head portion 22a forming a readily grippable handle. The handle portion 22a of the screw may be a plastic molded member held in place by a nut 23 threaded over the upper threaded end of the shank portion 22b of the screw. The end of the shank portion 22b is anchored in a manner permitting relative rotational movement thereof with respect to a second pivotally mounted member 34 having side flanges 34b—34b anchored by pivot-forming rivets 35—35 or the like to the rear upstanding lugs 36a—36a of a plate member 36 forming part of a tool-holding frame assembly 37. As best shown in FIG. 9, in the exemplary form of the invention described, the rotational connection between the bottom end of the shank portion 22b of the screw 22 is formed by closely axially spaced projections 22c—22c engaging the opposite sides of a bridging portion 34a of the member 34 extending between the aforementioned riveted flanges 34b—34b thereof. The tool-holding frame assembly 37 is mounted for pivotal movement about a laterally horizontally extending pivot axis formed by pivot-forming rivets 39—39. It can thus be seen as the screw 22 is rotated in one direction or the other, the tool-holding frame assembly 37 to which the bottom end of the screw 22 is connected will rise and fall, and the angle of the shank portion of the screw will vary, as permitted by the pivotally mounted members 30 and 34 to which the shank portion of the screw is connected.

The aforementioned plate member 36 of the tool-holding frame assembly 37, as best shown in FIG. 10, has a pair of front upstanding lugs 36b—36b to which the aforementioned pivot-forming rivets 39—39 pass. The heads of the rivets 39—39 are shown engaging the outer faces of the side frame members 2a—2a of the main frame of the tilling device. The plate member 36 has riveted thereto a recess-forming member 38 having flanges 38a—38a welded or otherwise secured to the plate member 36 (see FIG. 6) which flanges terminate in laterally spaced walls 38b—38b defining a tool shank-receiving recess 40 closed by an end wall 38c of the member 38. The tool shank-receiving recess 40 is open on the rearwardly facing side thereof to receive the shank of the tilling tool involved, as best shown in FIG. 9.

The shanks 46, 46' and 46" of the aforementioned tools preferably have a generally rectangular-shaped cross section, slidably to engage the correspondingly shaped inner surfaces of the members 36 and 38 forming the defining walls of the recess 40. In the most preferred forms of the invention, the tool shanks are identical members which are secured in place to other structural elements forming the tool involved by fastening means, like screw 48 threading into an axially extending aperture 47 shown in FIG. 9. Each tool shank 46, 46′ or 46″ has a pair of oppositely opening notches 46a–46b, 46a′λ–46b′, or 46a″–46b″, only one of which is used for latching the shank in place within the shank-receiving recess 40 of the tool-holding frame assembly 37. This latching means most advantageously comprises the inwardly spring-urged pin 27 having the aforementioned finger-receiving projecting head portion 27a. The latching pin 27 has a shank portion 27b with preferably parallel front and rear surfaces which slidably extend through a raised upper wall 44a of a member 44 having depending side walls 44b—44b terminating in securing flanges 44c—44c riveted or otherwise secured to the member 36 of the tool-holding frame assembly 37. The shank 27b of the latch pin 27 projects downward into the tool shank-receiving recess 40 and is urged into this position by a coil spring 42 having one end 42a bearing on shoulders 27c formed by projections of the latching pin shank 27b. The upper end 42b of the coil-spring 42 bears against the aforementioned raised wall 44a of the member 44.

To mount any of the tilling tools 24, 24′ or 24″ upon the tool-holding frame assembly 37, it is only necessary to slide the shanks 46, 46′ or 46″ thereof into the recess 40 with the tilling tool oriented so that the desired soil penetrating portion thereof faces the ground. In the case of the furrow-forming tilling tool 24, notch 46a or 46b will face in an upward direction and in the case of the tilling tools the notches 46a′ and 46a″ face upwardly. The free end portions of the shanks 46, 46′ and 46″ are tapered at 46c, 46c′ or 46c″ to provide camming surfaces along which the end of the latching pin 27 extending into the recess 40 will slide until the pin reaches the notch 46a or 46b, 46a′ or 46a″. The latching pin then drops into the notch and locks the tilling tool in place. To remove a tilling tool from the tool-holding frame 37, it is only necessary to pull up on the latching pin 27 by pulling on the projecting head portion 27a thereof, to remove the end of the latching pin from the recess 40, and then pulling the tilling tool from the recess. It is thus a very easy matter to change the tilling tools with the design of the tool-holding frame assembly 37 and the latching pin associated therewith, as just described. Also, because of the relationship of the tool shank to the recess 40 of the tool-holding frame assembly 37, the stresses on the tool-holding frame due to the forces imparted to the soil-penetrating portion of the tilling tool involved are minimized, so that a rugged tilling device can be made from parts which are of relatively thin cross section. For example, the wall thicknesses of the various portions of the tool-holding frame illustrated need be no greater than about inches thick when the parts are made of steel. The recess 40 formed thereby and the shank of the associated tilling tools may, for example, be about ½ inch square. The various parts illustrated may be made of other materials, such as zinc die cast materials. In either case, the shapes of the parts may be modified from that shown, especially for a most economical use of die cast materials.

Another unique aspect of the tilling device illustrated is the design of the furrow-forming tool 24 and the size and shape of the rear wheel 6 for the purposes same to be explained. As best shown in FIG. 1, the furrow-forming tool 24 preferably has a relatively wide end 24a and a relatively narrow end 24b, the wide end being used to dig wider and deeper furrows than the narrow end 24b. The laterally facing side edges of the wide and narrow ends of the furrow-forming member are generally rounded and form an outwardly tapered tool profile as best shown in FIG. 6. While the furrow formed by the tilling tool will form a shape and size approximating the shape and size of the end portion of the furrow-forming member which penetrates the soil, the bottom of the furrow formed thereby generally has clumps of dirt and/or various amounts of loose dirt which makes the spacing of the bottom of the furrow from ground level vary somewhat. To reduce this variation, as best shown in FIG. 7, the rear wheel 6 has an outwardly tapering periphery 6a which approximates in profile the size and shape of the narrower end of 24b of the furrow-forming tool 24. Thus, the rear wheel 6 will roll within the furrow formed by the active end of the furrow-forming tool 24 and the weight of the tilling device carried by the rear wheel 6 will cause the periphery of the rear wheel 6 to compact the soil particles in the bottom of the furrow to form a furrow bottom of a consistent tapered shape and depth. When the bulbs or root plants involved are dropped into the furrow, they will then be centered within the furrow portion, which is at a consistent depth from ground level for the reasons explained.

While the rear wheel 6 has the unique shape just described, the front wheel 4 preferably has a wide, flat periphery 4a. Also, the front and rear wheels 4 and 6 may be molded of synthetic plastic material or they can less desirably be made of metal.

When the furrow-forming tool is supported and placed on the tool-holding frame assembly 37, the soil-penetrating end of the active portion of the furrow-forming tool will incline downwardly and forwardly into the soil as shown in FIGS. 4 or 8. It is shown by these figures that as the tool-holding frame assembly 37 is lowered from its uppermost position shown in FIG. 4 by adjustment of the screw 22, the angle at which the soil penetrating portion thereof extends into the soil increases with respect to the vertical as the tool-holding frame is progressively lowered. The force necessary to propel the furrow-forming tool for any given depth of penetration of the tool is, therefore, decreased relative to the force which would be required if the angle of penetration remained constant.

The weed slicing tilling tool or hoe 24′ is used to sever weeds before they have a change to grow to any appreciable size. As illustrated, the hoe has, in addition to the shank 46′, a U-shaped head piece 50 having laterally spaced side flanges 50a—50a secured by nut and bolt fastening means 51—51 or the like to a slicing hoe-forming piece 52 having a weed cutting edge 52a. This edge 52a is formed on a bridging portion 52b of the hoe-forming screw 52 which terminates in upwardly extending arms 52c—52c secured to the head piece flanges 50a—50a by the fastening means 51—51.

Figure 3:
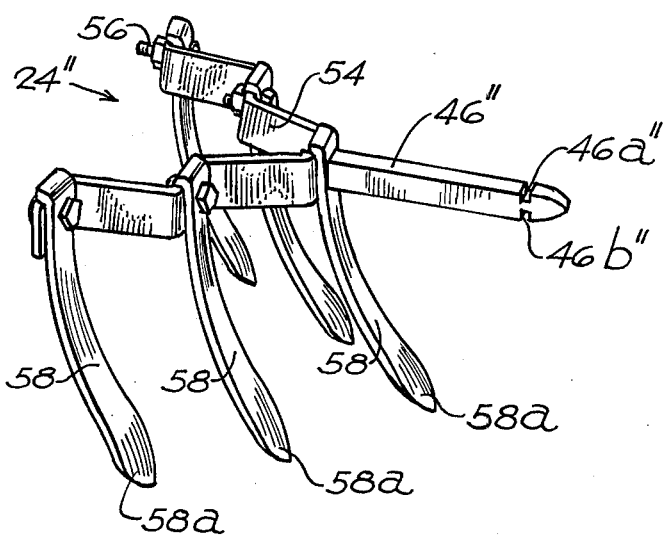
FIG. 3 is a perspective view of a cultivating device which may be substituted for the furrow-forming tool shown in FIG. 1.

The cultivating tool 24″ shown in FIG. 3 is used primarily to break up the soil between the furrows to make the soil loose, to enable the root system of the plants in the furrows to grow outwardly and to retain water. As illustrated, the shank 46″ of the cultivating tool 24″ is secured as by a screw, like screw 48 in FIG. 9, to a steel tine-supporting member 54 the different portions of which are secured by nut and bolt fastening means 56 to various cultivating tines 56. The tines 56 terminate at their bottom ends in downward and forwardly tapering soil-penetrating portions 56a.

It is apparent that the most preferred form of the invention described provides an exceedingly flexible, rugged and easy to manufacture tilling device with means provided for adjusting the degree of soil penetration by a simple screw adjustment, and wherein different tilling tools can be readily mounted upon and removed from the tilling device with ease.

It should be understood that numerous modifications can be made in the most preferred form of the invention illustrated in the drawings, just described within deviating from the broader aspects of the invention. For example, while the particular adjustment of the tool-holding frame and the other portions of the tilling device are preferably as described, the shapes and sizes and numbers of pieces making up the same may be varied widely without deviating from the broader aspects of the invention.

I claim:

1. In a hand-pushable tilling device including a main frame carrying ground-engaging front and rear wheels enabling the frame to be propelled in a forward direction, handle means on the main frame for manually pushing the tilling device, and a tilling tool having a soil-penetrating projecting portion adapted to enter the soil, the improvement in apparatus on said main frame for adjustably holding said tilling tool on said main frame between said front and rear wheels, said apparatus comprising tool-holding means for holding said tilling tool, means for supporting said tool-holding means for up and down and angular movement on said frame so that the soil-penetrating projecting portion of the tilling tool carried thereby extends forwardly into the soil at progressively increasing angles to the vertical as the tool holding means drops progressively in position on said main frame, and adjustable means for adjustably supporting said tool-holding means in any one of a number of different positions where said projecting portion of said tool has said varying depths and angles of soil penetration.

2. The hand-pushable, tilling device of claim 1, wherein said tool-holding means is a frame supported for pivotal movement about a lateral, horizontal axis extending transversely to the direction in which the device is propelled.

3. The hand-pushable tilling device of claim 2, wherein said adjustable means includes a first member pivotally supported about a horizontal, lateral axis on said main frame, and screw means having a rotatable handle portion and a threaded shank portion threading through said first member and connected to said tool-holding frame for varying the elevation of said tool-holding frame as said screw means is rotated in one direction or the other.

4. The hand-pushable tilling device of claim 3, wherein said shank portion of said screw means is connected to said tool-holding frame at a point spaced substantially from the point at which it is pivoted.

5. The hand-pushable tilling device of claim 3, wherein said shank portion of said screw means engages a second member pivotally mounted about a horizontal, lateral axis to a portion of said tool-holding frame.

6. The hand-pushable tilling device of claim 1, wherein said tilling tool has a shank portion terminating in said soil-penetrating projecting portion extending transversely thereto, said tool-holding means having a recess therein into which the shank portion of said tool is slidable, the recess extending generally horizontally when the tool-holding means is in its position where the projection portion of the tool has its minimum soil-penetrating position, and releasable tool-anchoring means extending transversely between said shank portion of the tool and said tool-holding means for releasably holding said shank portion of the tool inserted into said recess of said tool-holding frame.

7. The hand-pushable tilling device of claim 6, wherein there is provided aperture means in said shank portion of said tool, and said anchoring means are spring-urged latching means on said main frame which extends into said recess of said tool-holding frame in a direction to be urged into said aperture means of said shank portion of said tool when the tool is properly positioned on said tool-holding frame.

8. In a hand-pushable tilling device including a main frame carrying ground-engaging front and rear wheels enabling the frame to be propelled in a forward direction, handle means on the main frame for manually pushing the tilling device, and a tilling tool having a soil-penetrating projecting projecting portion adapted to enter the soil, the improvement in apparatus on said main frame for adjustably holding said tilling tool on said main frame between said front and rear wheels, said apparatus comprising tool-holding means for holding said tilling tool, means supporting said tool-holding means on said main frame for pivotal up and down movement about a lateral axis adjustable means for adjustably supporting said tool-holding means in any one of a number of different angular positions, said adjustable means including first means pivotally supported about a horizontal, lateral axis on said main frame, and screw means having a rotatable handle portion and a threaded shank portion threading through said first means and connected to said tool-holding means as said screw means is rotated in one direction or the other.

9. The hand-pushable tilling device of claim 8, wherein said shank portion of said screw means is connected to said tool-holding frame at a point spaced substantially from the point at which it is pivoted.

10. The hand-pushable tilling device of claim 8, wherein said shank portion of said screw means engages second means pivotally mounted about a horizontal, lateral axis to a portion of said tool-holding means.

11. In a hand-pushable tilling device including a main frame carrying ground-engaging front and rear wheels enabling the frame to be propelled in a forward direction, handle means on the main frame for manually pushing the tilling device, and a tilling tool having a shank portion terminating in a soild-penetrating projecting portion adapted to enter the soil, the improvement in apparatus on said main frame for holding said tilling tool, said apparatus including a tool-holding means, said tool holding means having a horizontally opening and extending recess therein into which the shank portion of said tool is slidable in a generally horizontal direction, and releasable tool-anchoring means extending transversely between said shank portion of the tool and said tool-holding means for releasably holding said shank portion of the tool inserted into said recess of said tool-holding means.

12. The hand-pushable tilling device of claim 11 wherein there is provided aperture means in said shank portion of said tool, and said anchoring means are spring-urged latching means on said tool-holding means which extends into said recess of said tool-holding means in a direction to be urged into said aperture means of said shank portion of said tool when the tool is properly positioned on said tool-holding means.

13. The hand-pushable tilling device of claim 11 wherein there is provided at least two tilling tools each with a shank portion adapted to be slid into and held by said tool anchoring means, the shank portion of one of said tools terminating at its front end in a soil-penetrating projecting portion extending generally transversely of said shank portion and adapted to enter the ground and form a furrow therein and the shank portion of the other of said tools terminating at its front end in cultivating tines extending generally transversely of said shank portion for breaking up the soil between the furrows.

14. The hand-pushable tilling device of claim 13 wherein said shank portions of said tilling tools have aperture means, and there is provided spring-urged latching means on said tool holding means and extending into said recess in a direction to be urged into said apertures means of the shank portion of the selected tilling tool when the tool is properly positioned in said recess.

15. The hand-pushable tilling device of claim 13, wherein said tool-holding means is a frame supported for pivotal movement about a lateral horizontal axis extending transversely to the direction in which the device is propelled, so the soil-penetrating projecting portion of the tilling tool carried thereby extends forwardly into the soil at progressively increasing angles to the vertical as the tool support frame drops progressively in position on said main frame, and adjustable means for adjustably supporting said tool-holding means in any one of a number of different positions where said projecting portion of the selected tool has said varying depths and angles of soil penetration.

16. The hand-pushable tilling device of claim 13 wherein said adjustable means includes a first member pivotally supported about a horizontal, lateral axis on said main frame, and screw means having a rotatable handle portion and a threaded shank portion threading through said first support member and connected to said tool-holding frame for varying the elevation of said tool-holding frame as said screw means is rotated in one direction or the other.

17. The hand-pushable tilling device of claim 11 wherein said tilling tool is a furrow-forming tool having a shank portion terminating at one end in oppositely transversely extending furrow-forming porjections of different size for cutting furrows of a different size, and said shank portion thereof and said recess of said tool-holding means are sized and shaped so that said shank portion of said tilling tool can be supported in said recess in either a first orientation where one of said furrow-forming projection extends into the ground or the opposite orientation where the other furrow-forming projection extends into the ground.

18. The hand-pushable tilling device of claim 17, wherein said tool holding means comprises aperture means in the oppositely facing sides of said shank portion of the furrow-forming tool, inwardly spring-urged latching means extending from said tool holding means in a direction to be urged into said one of said aperture means of said shank portion of said furrow-forming tool when the tool is properly positioned on said tool holding means.

19. The hand-pushable tilling device of claim 11 wherein said tilling-tool is a furrow-forming tool having a soil-penetrating projecting portion for forming a furrow in the ground where bulbs, seeds or the like are to be laid, a rear wheel thereof is in alignment with said furrow-forming tool and narrower than the width of the furrow formed thereby so that the rear wheel will roll within the furrow formed by said furrow-forming tool to pack down the earth in the bottom of the furrow to form a furrow of consistent depth and shape.

20. The hand-pushable, tilling device of claim 19, wherein the furrow-forming tool has an outwardly tapering profile, and the periphery of said rear wheel has an outwardly tapering projection which forms a furrow of corresponding shape thereto.

* * * * *